United States Patent [19]
Jasinski

[11] 3,950,077
[45] Apr. 13, 1976

[54] LEAD REFERENCE AND COUNTER ELECTRODE FOR AN ELECTROCHROMIC DISPLAY

[75] Inventor: Raymond J. Jasinski, Dallas, Tex.

[73] Assignee: Texas Instruments Incorporated, Dallas, Tex.

[22] Filed: Sept. 20, 1974

[21] Appl. No.: 507,913

[52] U.S. Cl. .............................. 350/160 R; 340/336
[51] Int. Cl.² .......................................... G02F 1/28
[58] Field of Search......... 350/160 R; 204/299, 181; 96/1 PE; 340/336

[56] References Cited
UNITED STATES PATENTS

| | | | |
|---|---|---|---|
| 3,451,741 | 6/1969 | Manos | 350/160 R |
| 3,736,043 | 5/1973 | Sambucetti | 350/160 R |
| 3,806,229 | 4/1974 | Schoot et al. | 350/160 R |
| 3,854,794 | 12/1974 | Van Dam et al. | 350/160 R |

Primary Examiner—Alfred E. Smith
Assistant Examiner—Jon W. Henry
Attorney, Agent, or Firm—Harold Levine; James T. Comfort; James O. Dixon

[57] ABSTRACT

Disclosed is an improved electrochromic optical display cell having a memory, long life, good contrast independent of viewing angle, reversibility, low switching voltage, and a low mean power consumption wherein a soluble colorless dye is selectively and reversibly reduced at a display electrode to form an insoluble, insulating film that markedly absorbs visible light. The electrochromic display cell includes a display electrode and a non-polarizable counter electrode which simultaneously maintains a threshold potential while providing charge transfer to a electrolytically reduce the dye during a write cycle or oxidize the dye during an erase cycle. The preferred counter electrode forms a lead/lead phosphate half cell which has a substantially stable electrochemical potential over the area of operation, reversibly undergoes oxidation-reduction and will not substantially irreversibly reduce the dye. Further, the lead counter electrode can be electrochemically restored by reverse electrolysis.

17 Claims, 4 Drawing Figures

LEAD REFERENCE AND COUNTER ELECTRODE FOR AN ELECTROCHROMIC DISPLAY

This invention relates to use of a single non-polarizable electrode for maintaining a threshold potential while simultaneously providing charge transfer in an electrochromic optical display cell, and more particularly to a lead electrode that simultaneously maintains the cell at an electrochemically stable potential regardless of current flow while simultaneously providing for the transfer of an incremental electrolysis charge to oxidize or reduce an electrolyte dye.

The use of electrochromics for optical displays is of relatively recent origin. The concept of electrochromics involves the reversible oxidation and reduction of an organic soluble ionic substance in an electrolytic cell to form an insoluble, colored film at one of the electrodes.

In one electrochromic cell, a potential is applied to reversibly reduce a soluble, colorless dye at a display electrode. The reduced dye is plated on the display electrode, forming an insulating, insoluble adherent film. The formed film markedly absorbs visible light and conforms to the surface shape of the display electrode. Thus, an optically discernible chromatic display configured in a shape corresponding to the energized display electrode may be reversibly "written".

Upon applying a reverse current through the cell the colored film is oxidized at the display electrode. Once oxidized, the soluble colored film again becomes a soluble colorless ion. The previously optically discernible display is thus "erased". By alternatively reversing the current flow within the cell an optical display may be written and erased many times.

Electrochromic cells are preferred for use as optical displays for a number of reasons. Once reduced, the insoluble dye has a "memory". That is, the reduced insoluble colored dye remains reduced on the display electrode until subsequently oxidized not withstanding the removal of the reducing current flow. Further, because the cell itself has a threshold potential, multiplexing of many display electrodes is possible. Such multiplexing diminishes both the complexity and the components of the current supplying system, and thus facilitates miniaturization. Also, because the dye is spectra absorbing, the color contrast does not diminish regardless of the viewing angle. Additionally, the switching voltage and more importantly, the mean power consumption is minimal.

Electrochromic optical display cells thus promise a significant advantage in cost and size over the other display techniques heretofore used. However, electrochromic cells presently known in the art suffer from disadvantages and limitation which render them of a diminished value in self-contained display applications such as a digital watch display.

In the heretofore known display cell, a reference electrode is required in addition to the display electrode and the counter electrode. The reference electrode establishes and maintains the threshold potential during the plating of the dye. Maintenance of the threshold potential is required to form an insulating film on the cathode. Additionally, this potential stabilizes the reversibility of the reduced dye by preventing formation of irreversible products.

The reduction of the dye will not proceed unless the applied voltage is greater than the sum of the half cell potentials of the cell. Thus, an applied voltage approximately equal to the threshold potential is also required to facilitate rapid reduction of the dye. Thus, in heretofore known cells, the reference electrode is required to provide color contrast, acceptable writing times, and prevent the irreversible reduction of the dye.

Cells containing separate reference electrodes have disadvantages. An external potential regulating circuit is required. This circuit increases the space required for cell placement and the complexity of the control electronics thus decreasing the reliability of the display.

In the present invention, an electrochemical optical display cell contains a display electrode and a single non-polarizable electrode which combines the functions previously performed by the counter electrode and the reference electrode to overcome the disadvantages previously mentioned. In accordance with the broader aspects of the invention, the single counter electrode maintains a threshold voltage during current flow in an electrolytic cell while simultaneously providing for transfer of an applied incremental charge to reversibly reduce an electrochromic dye.

In a preferred embodiment, the non-polarizable counter electrode is lead. The lead electrode forms an elemental lead/lead phosphate half cell. The term lead phosphate is used in its general sense and intended to also include salts of lead hydrogen phosphate and lead dihydrogen phosphate. Additionally, lead hydroxide may enter into the half cell reaction either as an intermediate or a complex with the phosphate.

In a further aspect of the instant invention, a non-polarizable counter electrode forms a half cell having a potential of a magnitude such that shorting the display electrode to the counter electrode oxidizes the insoluble reduced dye film. Thus, application of additional electrical energy to the cell from an external source is not required to erase the display.

In another aspect of the instant invention, the electrochemical potential of the non-polarizable counter electrode can be restored by reverse electrolysis without deleteriously affecting the display operation of the cell.

The invention and further advantages thereof will be better understood by reference to the following detailed description of illustrative embodiments taken in conjunction with the accompanying drawings in which.

Figure 1:
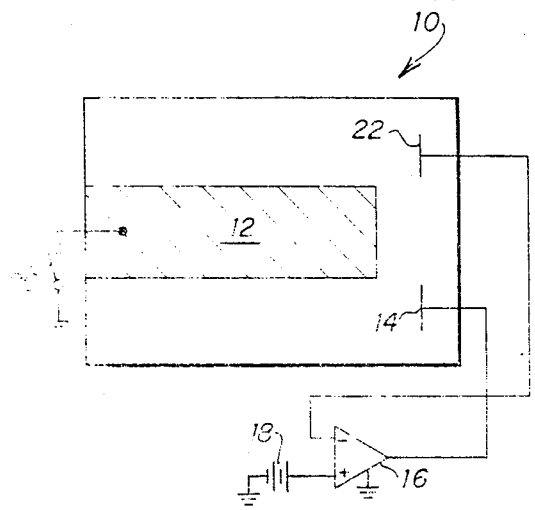
FIG. 1 is a schematic illustration of a prior art electrochromic cell.

Referring now to the drawings and specifically to FIG. 1, there is illustrated generally a prior art electrochromic optical display cell 10, utilizing the n-heptylviologen bromide color forming electrolyte. Specifically, the cell 10 contains a display electrode 12 which is connected to ground through a single pole, single throw switch 20. A counter electrode 14 is connected to the output of an operational amplifier 16 and a reference electrode 22 is connected to the negative side of the amplifier 16. The positive side of amplifier 16 is connected to the positive side of a battery 18. Amplifier 16 is biased to ground and the negative side of battery 18 is also connected to ground. Within cell 10 is contained a fluid electrolyte consisting of water, a n-heptylviologen cation and a bromide anion.

In operation, switch 20 is initially open and the n-heptylviologen cation is in the soluble colorless oxidized state within the cell. Upon closing switch 20 a voltage is placed across the cell. This voltage causes electrons to flow to the display electrode 12. At the display electrode 12 the n-heptylviologen cation accepts an electron and combines with a bromide anion in the presence of water to form a cation radical insoluble colored film as follows:

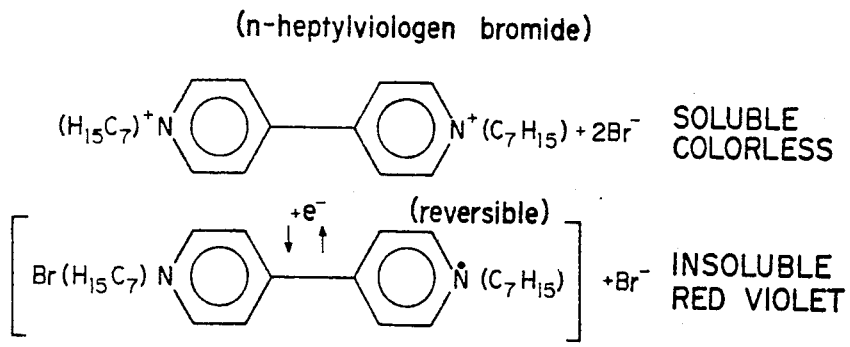

As the cation is reduced, a progressively thicker layer of the film forms upon the display electrode 12. The film coated display electrode acts as a secondary electrode in the cell with respect to the bromide anion. Additionally, the resistance between the reference electrode and the display electrode increases, changing the reference voltage on the operational amplifier 16.

The threshold voltage which is approximately equal to the sum of the half cell potentials within the cell is continually applied across the cell by amplifier 16. The operational amplifier 16 varies the applied voltage as a function of the potential detected by the reference electrode 22. By maintaining the voltage across the cell above the threshold potential the film is formed very rapidly, for example in the order of from 10 to 50 milliseconds.

Thus, the reference electrode 22 in conjunction with the amplifier 16 is required to rapidly coat an optically sufficient film of the insoluble colored dye on the display electrode 12. The insoluble colored film once coated upon the display electrode will remain visible until oxidized. In the absence of oxidizing agents such as contaminants, free oxygen and the like, the display will remain visible indefinitely.

The display is erased by reversing the current flow between the display electrode 12 and the counter electrode 14 through a switch designed for that function (not shown). In the erase cycle, the reduced n-heptylviologen bromide radical cation is oxidized at the display electrode. The oxidized dye again forms the soluble, colorless cation, which dissolves invisibly in the water present in the cell. However, the number of write/erase cycles possible utilizing cell 10 is limited.

Specifically, cells utilizing aqueous n-heptylviologen bromide dye solutions are prone to rapid degradation which may be characterized as hysteresis. That is, red/brown spots develop on the display electrode after relatively few write/erase cycles. The hysteresis effect is particularly pronounced when silver or gold display electrodes are utilized. Additionally, the presence of the bromide ion solubilizes silver and gold anodes during erasure, contaminating the solution.

Erasing the hysteresis spots from the electrode can be accomplished but only slowly and at very high potentials. Additionally, such an erasing procedure causes black blemishes to develop on the display electrode which cannot be removed at all. Further, the electrodes are solubilized at these potentials.

This hysteresis effect is directly proportional to the bromide ion concentration in the electrolyte solution. Specifically, concentration of bromide ion greater than about $10^{-5}$ molar for a gold electrode and greater than about $10^{-4}$ for a silver electrode are deleterious when the cell is cycled repeatedly over extended periods.

Figure 2:
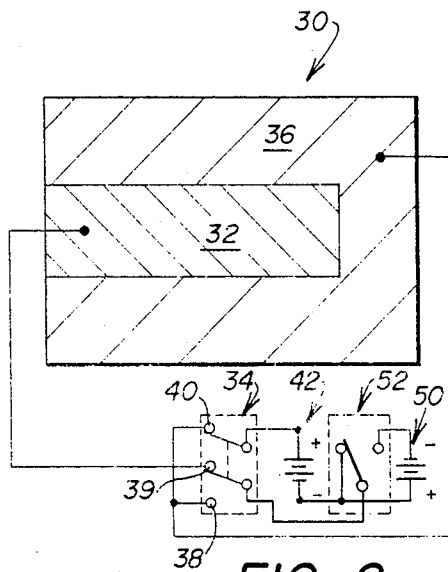
FIG. 2 is a schematic illustration of a cell incorporating the instant invention.

Turning now to the instant invention and referring to the remainder of the drawings, wherein like reference numerals designate like or corresponding parts throughout the several views, there is generally illustrated in FIG. 2, the electrochromic cell of the instant invention. The cell contains a counter electrode which simultaneously maintains a threshold potential while providing transfer of an incremental electrolysis charge.

Specifically, FIG. 2 shows an electrochromic cell 30 of the instant invention containing a lead counter electrode 36, which can be connected to either terminal of a battery 42 through switch 34; a gold display electrode 32, which is connected to the remaining terminal of the battery 42 through the switch 34; and an electrolyte contained within cell 30 in contact with both electrode 32 and electrode 36. The electrolyte contained within the cell consists of water, a n-heptylviologen cation, a dihydrogen phosphate anion, and a potassium dihydrogen phosphate salt buffer.

When a potential is applied across the cell such that the display electrode 32 is a cathode, the cell will "write" by reversibly reducing the soluble colorless dye to the radical cation of n-heptylviologen dihydrogen phosphate. The reduced dye is deposited as an insoluble, insulating colored film on the display electrode 32. When the circuit is opened, i.e., no electromotive force is applied across the cell, the dye remains reduced as the film. When the switch 34 is positioned to apply a part of the battery potential across the cell such that the display electrode is the anode, the radical film is reversibly oxidized back to the n-heptylviologen cation and the dihydrogen phosphate anion. The cation is a colorless soluble dye. Thus, the display is erased.

More specifically, the cell 30 is construced of transparent electrochemically inert substance such as clear plastic, glass, or the like. The inside of the cell 30 defines a volume. The defined volume has gas/liquid integrity.

Disposed within the volume of cell 30 and bonded to the back wall of the cell, is the counter electrode 36, consisting of a thin coat of lead. Electrically insulated from the lead coating is the display electrode 32. The display electrode 32 may be a thin layer of gold.

The display electrodes that may be used in accordance with the invention are metallic substances which will not form insoluble salts during electrolysis and will not be solubilized by the electrolyte. Gold is preferred. Both electrodes 36 and 32 may be disposed in a single plane within the cell if desired.

The counter electrode 36, as the anode during the write cycle electrolytically liberates an electron to yield a lead phosphate. This half reaction has an oxidation reduction potential E° of about +500 millivolts with respect to a conventional hydrogen electrode in the same solution. Further, the counter electrode is substantially non-polarizable.

Polarization of reversible electrodes is a well known phenomena wherein the redox potential of a half cell for a given concentration will vary upon application of an external emf during electrolysis. Such potential disturbances are generally called "electrolytic polarization". It has been found that the lead/lead phosphate half cell redox potential is sufficiently immune to this phenomena over the range of operating current required to reduce the n-heptylviologen cation. Therefore, by using the lead counter electrode, and more particularly, the lead/lead phosphate half cell reaction during electrolysis, the equilibrium potential is essentially maintained throughout the reduction, as well as the oxidation of the n-heptylviologen dye. Thus, the use of a lead counter electrode allows maintenance of a substantially constant threshold voltage throughout a write or erase cycle.

Moreover, it has been found that the oxidation and reduction of the lead electrode itself is electrochemically efficient. That is, the electrode reversibly undergoes oxidation and reduction without significant loss of electrochemical potential. The efficiency of the lead electrode has been shown to be about 99.995 percent in environments free of outside oxidation or reduction agents.

The charge transfer reaction of the lead half cell is as follows:

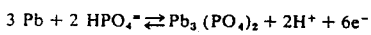

The electrolyte is hermetically contained in the volume defined by the cell 30. Thus, the electrolyte is in intimate contact with electrodes 36 and 32. The electrolyte contains a cation of n-heptylviologen having the following structures:

and an anion of dihydrogen phosphate ($H_2PO_4^-$); water, and a potassium dihydrogen phosphate salt which acts as a buffer. The amount of the buffer salt in solution will determine the concentration of the n-heptylviologen cation. For example, when the buffer is 2 molar, the cation concentration is from about 0.14 molar to about 0.16 molar. In a 3 molar buffer solution, the cation concentration is from about 0.04 molar to about 0.05 molar. It has been found that solutions with concentrations greater than about 90 percent of saturation wherein saturation is determined by the n-heptylviologen ion salt concentration in the water/dihydrogen phosphate solution are unstable. The concentration of the buffer salt within the solution is from about 1 molar to about 3 molar is the same.

The electrolytes used in accordance with the invention need contain the n-heptylviologen cation, water, and an anion which will combine with the n-heptylviologen cation during reduction to produce an insoluble, insulating, colored film. Additionally, the anion is preferably otherwise substantially inert, i.e., will not solubilize the display electrode nor form insoluble salts during electrolysis or regeneration.

The electrolyte previously used in electrochromic cells contained a bromide anion (n-heptylviologen bromide). It has been found however, that the bromide ion is not a preferred anion and specifically, that concentration greater than about $10^{-4}M$ or $10^{-5}M$ tend to solubilize silver and gold electrodes, respectively. Further, it has been determined that during repeated erase and write cycles, the bromide ion tends to cause a "hysteresis" effect on the display electrode. The hysteresis effect, characterized by reddish-brown spots on the electrode must be erased by applying a large reverse potential across the cell. This large reverse potential itself is deleterious to the cell in that it produces black blemishes on the display electrode which cannot be erased, exhausts the electrochemical potential of the electrode, and further solubilizes the display electrodes.

In the preferred electrolyte used in accordance with the invention, n-heptylviologen bromide is initially prepared by reacting dipyridyl and n-heptylbromide. Then, through an anion exchange process, the dihydrogen phosphate ($H_2PO_4^-$) is substituted therefor. The resulting electrolyte is substantially pure dissociated solution of n-heptylviologen dihydrogen phosphate. Traces of n-heptylviologen bromide may remain because of the inability to effect complete anion substitution. Preferably the electrolyte contains less than about $10^{-5}$ molar bromide anion. The bicarbonate ($HCO_3^-$) anion also can be substituted for the bromide, yielding n-heptylviologen bicarbonate.

The bicarbonate anion may be used in accordance with the invention, however, it is not preferred. Specifically, it has been found that the pH of the electrolyte must be maintained in a range from about 7.8 to about 8.0 to assure the stability of the bicarbonate anion. Specifically, it has been found that at pH's lower than about 7.8, the bicarbonate anion combines with a hydrogen ion and decomposes liberating carbon dioxide and water. Since the pH range at which the cation dye operates most effectively are below 7.8. The bicarbonate and ion can be used as the anion of the electrolyte only at the sacrifice of dye performance.

This electrolyte and the process for anion substitution is disclosed in copending application Ser. No. 507,895, filed Sept. 20, 1974 for Electrolyte for Electrochromic Displays, which is herein incorporated by reference.

The preferred electrolyte contains a potassium or sodium salt of the anion to buffer the pH of the electrolyte solution. When the anion is a dihydrogen phosphate, the preferred buffer is potassium dihydrogen phosphate. The electrolyte is preferably buffered to a pH of about 5.5 to about 7.5. It has been found that a pH of about 5.5 gives a greater contrast color (i.e., a darker color) to the reduced dye. A pH above 7.5 has been found to cause a precipitate which is deleterious to the function of the cell.

The battery 42 may be any type known in the art, such as a dry cell, an alkaline cell, or the like. The power required to reduce the n-heptylviologen cation is from about 4 to about 6 millijoules per square centimeter of display electrode surface.

In operation, the cell 30 is normally in a stable erase state. The n-heptylviologen is the soluble, colorless cation. To write, the switch 34 is positioned such that the potential of the battery 42 is applied across contacts 39 and 40. The dislay electrode 32 thus becomes a cathode, while the counter electrode 36 becomes an anode. An electrolysis current applied through the cell reduces the n-heptylviologen cation at the display electrode to an insoluble anion radical cation complex that markedly absorbs visible light.

During the write cycle, the film forming on the display electrode increases the resistance of the electrode, changing the ohmic characteristics of the cell. The lead/lead phosphate half cell however, maintains a substantially constant oxidation reduction potential throughout the film forming process. Thus, the insoluble colored film continues to form on the display electrode at a relatively rapid rate.

Switch 34 is then placed in a neutral position such that the potential of battery 42 is not applied across any of the contact points. Thus, no emf is applied across the cell. The reduced dye remains in its colored state. The cell could maintain the electrochromic "optical display" once written, for an indefinite period; however, oxidizing contaminants such as air and the like, tend to deteriorate the colored film in time.

The display is erased by placing the switch 34 so as to apply the battery 42 across contacts 38 and 39. The display electrode becomes the anode of the cell. At the display electrode then, the insoluble colored film is reversibly oxidized to the colorless soluble cation. The written display is thus erased.

It will be realized by those skilled in the art that reversing the current flow in the cell to oxidize the insoluble colored film at the display electrode 32 causes simultaneous reduction of the soluble cation dye at the cathode counter electrode 36. Thus, the counter electrode must in some way be "masked" (not shown) such that the colored dye being reduced at the counter electrode during the erase mode will not be visible to the display reader. The masking can be accomplished by any means known in the art.

Further, the display electrode may be transparent such as a thin layer of gold coated on the inside of the transparent covering on the cell. Thus, the reduced dye will be formed on the underside of the electrode, i.e., the side opposite the observer. The reduced dye is thus optically discernible through the display electrode itself. When utilizing this embodiment, the display electrode masks the counter electrode such that the colored dye being reduced at the counter electrode during the erase cycle is not visible.

The procedure of writing and erasing the display may by cycled almost indefinitely. The lead, and more particularly the lead/lead phosphate half cell, is electrochemically efficient, being easily and reversibly oxidized and reduced. Further, the electrode provides a threshold potential throughout the oxidation and reduction cycle, in addition to eliminating the reference electrode which requires additional power sources and complicated operational amplifiers. The insoluble colored film forms rapidly at the display electrode during a write cycle and erases rapidly during an erase cycle with a minimum switching voltage and a low mean power consumption.

According to another aspect of the invention, the lead counter electrode may be regenerated to restore the electrochemical potential without deleteriously affecting the cell operation. The lead/lead phosphate half cell has a redox efficiency approaching 99.995 percent. Even with this high efficiency, the cell would be essentially exhausted in six months if cycled every minute. Additionally, contaminants and air leaks in the cell tend to electrochemically degenerate the electrodes.

Regeneration of counter electrodes and electrochromic cells is described in pending application Ser. No. 507,896, filed Sept. 20, 1975, by Raymond J. Jasinski for Regenerating Electrode for Electrochromic Display Cells, which is herein incorporated by reference. The lead electrode is regenerated by applying a potential across the cell, which is in excess of the oxidation reduction potential of the cell.

Specifically, as shown in FIG. 2, a battery 50 is connected in series with battery 42 by means of a single pole, single throw switch 52. In operation, the regenerating mode proceeds by positioning switch 34 so that the counter electrode 36 is a cathode. Switch 52 is then closed, resulting in an applied cell voltage of from about 1.3 to about 1.5 volts. Thus, the gold display electrode 32 functions as both a regenerating electrode and as a transfer electrode directly involved in the reversible electrolysis of the electrochromic dye.

It has been found in accordance with the invention, that the oxidation products generated by regenerating the lead electrode will not react with the reduced dye to erase the display. Therefore, a hermetically sealed electrochromic display cell may be electrochemically rejuvenated periodically. The regeneration sequence may be triggered periodically as a function of cell operating time or by monitoring the degradation of the electropotential of the cell itself.

Figure 3:
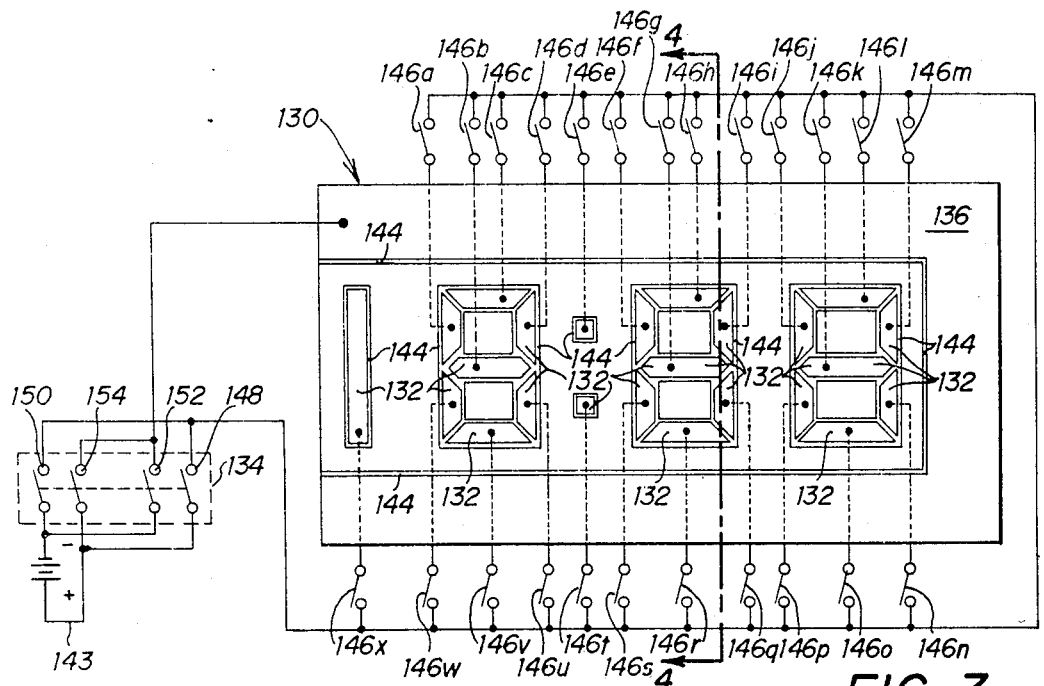
FIG. 3 is a top view of an electrochromic optical display cell constructed in accordance with one embodiment of the invention.
Figure 4:
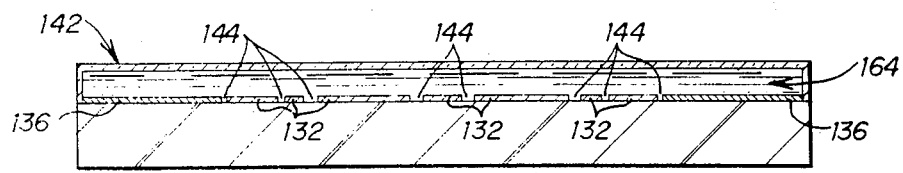
FIG. 4 is a sectional view of the cell in FIG. 3 taken along line 4—4.

Another embodiment in accordance with the instant invention is shown in FIG. 3. Specifically, a cell 130, as better seen in FIG. 4, includes an insulating plastic back wall 140 and a transparent glass front wall 142. Bonded to the back wall 140 is a lead coating which forms the counter electrode 136. Electrically insulated from direct contact with the counter electrode 36 and from each other by a series of gaps 144 is display electrodes 132.

As better shown in FIG. 3, display electrodes 132 are connected through a series of switches 146a through 146, inclusive, to contacts 148 and 150 of switch 134. Likewise, counter electrode 136 is connected to contacts 152 and 154 on one side of switch 134. On the other side of switch 134, both pairs of contacts are connected to a battery 143.

Referring again to FIG. 4, an electrolyte identical to that previously described, in accordance with the invention, is contained within the volume 164. The electrolyte is visible through transparent front wall 142. The electrolyte completely fills the volume 164, including the gaps 144 separating the various electrodes.

In operation, a series of switches 146a through 146 are selectively opened and closed to complete a circuit between the contacts 154 and 152 on one side of switch 34. For example, to display the digital representation of three o'clock, the following switches would be closed: 146b, 146c, 146d, 146v, 146u, 146e, 146t, 146f, 146h, 146i, 146s, 146r, 146q, 146j, 146l, 146m, 146n, 146o, and 146p. To write "three o'clock" switch 134 is positioned so that the battery 143 is applied across contacts 150 and 154.

Only one counter electrode is needed. The selected display electrodes will reduce the dye to the insoluble film as previously described. Each display electrode will be visible, forming a display pattern: 3:00. Once the write cycle is completed, the switch 34 is positioned to open the circuit. The display will remain visible until erased. To erase the digital representation of three o'clock, the switch 134 is positioned such that battery 143 is applied across contacts 152 and 148. Switches 146a through 146 can then be positioned to write 3:01. Battery 143 is then applied across contacts 150 and 154 as previously described.

As previously discussed herein, the lead counter electrode and more particularly the lead/lead phosphate half cell is non-polarizable, thus maintaining a constant potential. The half cell potential is also more positive than the viologen half cell potential. Thus, in accordance with another aspect of the invention, the electrochromic cell may be written by shorting the non-polarizable counter electrode to the display electrode. Thus, no additional external current is required.

The following is illustrative of the instant invention. An electrochromic cell containing a single counter electrode as described above was prepared as follows:

Ag (display)/2M NaH$_2$PO$_4$(PH5.5)/Pb HPO$_4$/Pb
(counter)

This cell was operated as previously described by applying an electrolysis voltage of −700 molar to write the display and +100 molar to erase. The cell was operated for over $1.0 \times 10^{+6}$ cycles with good contrast and complete erasure.

Further, the cell displayed no sign of hysteresis. The mean power requirement was approximately 6 millijoules.

While the invention has been explained in relation to its preferred embodiment, it is to be understood that various modifications thereof will now become apparent to those skilled in the art upon reading the specification and it is intended to cover such modifications as fall within the scope of the appended claims.

What is claimed is:

1. An electrochromic display cell comprising:
   a. cell structure means defining a sealed volume;
   b. an electrolyte composition completely filling said volume comprising water, a dihydrogen phosphate anion and an n-heptylviologen cation which when reversibly reduced combines with said anion to produce an insoluble insulating film that markedly absorbs visible light;
   c. a lead counter electrode contained in said cell structure means and contacting said electrolyte forming a lead/lead phosphate half cell;
   d. a display electrode contained in said cell structure and contacting said electrolyte;
   e. means for applying an electrical voltage across said cell to effect an electrolytic current flow; and
   f. means for reversing said current flow across said cell such that said cation is reversibly reduced on said display electrode to an insoluble, insulating, colored adherent film and subsequently oxidized to a colorless soluble cation.

2. The cell of claim 1 wherein said electrolyte further contains a buffered salt of said anion in concentration from about 1.0M to about 3.0M.

3. The cell of claim 2 wherein said buffered salt is selected from a group consisting of potassium dihydrogen phosphate and sodium dihydrogen phosphate.

4. The cell of claim 1 wherein said second electrode is gold.

5. The cell of claim 1 wherein the concentration of the n-heptylviologen cation is from about 0.04M to about 0.16M.

6. The cell of claim 1 wherein said cell structure has at least one transparent wall and wherein said electrodes are bonded to a cell surface opposite said transparent wall.

7. The cell of claim 1 wherein said means for reversing said current flow across said cell comprises a circuit for shorting said first electrode to said second electrode.

8. A electrochromic display cell comprising:
   a. a substantially non-polarizable lead counter electrode;
   b. a display electrode;
   c. a cell structure, defining a sealed volume, containing said non-polarizable electrode and said display electrode;
   d. an electrolyte composition completely filling said volume comprising water, a dihydrogen phosphate anion, and an n-heptylviologen cation which when reversibly reduced combines with said anion to produce an insoluble insulating film that markedly absorbs visible light; and
   e. means for applying an electrical potential across said cell to effect a reversible electrolytic current flow such that said cation is reversibly reduced on said display electrode to an insoluble, insulating, colored adherent film and subsequently oxidized to the colorless soluble cation.

9. An electrochromic display cell comprising:
   a. a cell structure comprising a first opaque nonconducting back wall, and a second transparent nonconducting front wall, said back wall and said front wall defining a sealed volume;
   b. an electrolyte composition completely filling said volume comprising water, a dihydrogen phosphate anion and an n-heptylviologen cation which when reversibly reduced combines with said anion to produce an insoluble insulating film that markedly absorbs visible light and a buffer salt from a group consisting of sodium dihydrogen phosphate and potassium dihydrogen phosphate;
   c. a first electrode of a thin coat of lead bonded to said back wall of the cell structure and intimately contacting said electrolyte;
   d. a second electrode of a thin coat of gold intimately contacting said electrolyte, and electrically insulated from said first electrode;
   e. a battery for supplying a voltage across said cell to effect a current flow through said electrodes; and
   f. switching means for applying said voltage such that said second electrode is alternatively a cathode and then an anode such that said cation is reversibly reduced on said second electrode to an insoluble, insulating, colored adherent film and subsequently oxidized to a colorless soluble cation.

10. The cell of claim 9 wherein said switching means comprises a first switch for applying said voltage across said cell structure; and a second switch for shorting said first electrode to said second electrode in the absence of a potential across the cell.

11. A method of writing and erasing an electrochromic display cell having a display electrode, a counter electrode of lead, and a electrolyte containing water, an n-heptylviologen cation and a dihydrogen phosphate anion which will reversibly combine with said cation during reduction to form an insoluble insulating adherent colored dye comprising the steps of:
 a. applying a first voltage across said cell such that said display electrode becomes a cathode reversibly reducing said cation to said insoluble, insulating, colored, adherent film to write an optically discernible display; and
 b. applying a second voltage across said cell such that said display electrode becomes an anode reversibly oxidizing said insoluble colored adherent film to erase said optically discernible display.

12. The method of claim 11 wherein said first voltage across said cell is applied by shorting said display electrode to said counter electrode.

13. The method of claim 11 wherein said first voltage and said second voltage are supplied by a battery.

14. A digital electrochromic cell for a watch display comprising:
 a. a cell structure comprising a first opaque nonconducting back wall and a second transparent nonconducting front wall, said back wall and said front wall defining a sealed volume;
 b. a first electrode of a thin coat of lead bonded to said back wall of the cell structure;
 c. a second electrode bonded to said back wall of the cell structure comprising a plurality of thin metallic strips forming a digital configuration such that an optical display representing time in hours and minutes is formed, each strip being electrically insulated one from the other and from said first electrode;
 d. an electrolyte composition completely filling said volume and intimately contacting said first electrode and said second electrode comprising water, a dihydrogen phosphate anion and an n-heptylviologen cation which when reversibly reduced combines with said anion to produce an insoluble insulating film which markedly absorbs visible light;
 e. a battery for supplying a voltage across said cell to effect a current flow through said electrode;
 f. switching means for applying said voltage selectively to a specified number of said metallic strips of the second electrode; and
 g. switching means for reversing said current flow across said cell structure such that said first electrode is alternately a cathode and an anode.

15. The cell of claim 14 wherein said metallic strips are gold.

16. The cell of claim 14 wherein said electrolyte further comprises a buffered salt of said dihydrogen phosphate selected from a group consisting of dihydrogen phosphate and potassium dihydrogen phosphate in concentrations from about 1.0M to about 3.0M.

17. The cell of claim 14 wherein the concentration of the n-heptylviologen cation is from about 0.04M to about 0.16M.

* * * * *